Jan. 2, 1923.

J. BARWICKI.
RAT TRAP.
FILED APR. 6, 1922.

Inventor
John Barwicki
By [signature]
Attorney

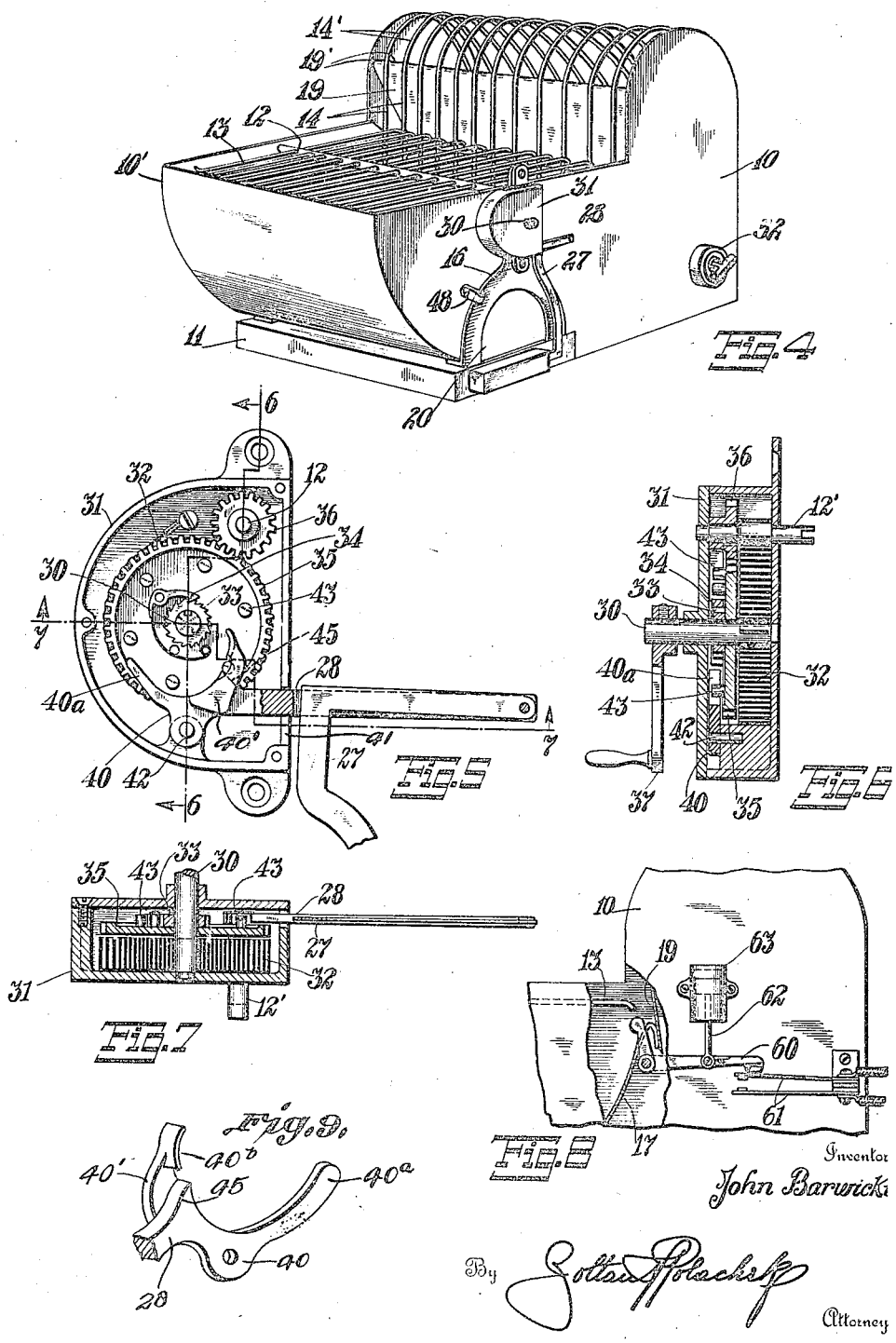

Patented Jan. 2, 1923.

1,440,901

UNITED STATES PATENT OFFICE.

JOHN BARWICKI, OF NEW YORK, N. Y.

RAT TRAP.

Application filed April 6, 1922. Serial No. 550,195.

*To all whom it may concern:*

Be it known that I, JOHN BARWICKI, a citizen of Poland, residing at New York, in the county of New York and State of New York, have invented certain new and useful Improvements in Rat Traps, of which the following is a specification.

This invention relates to animal traps, having more particular reference to a trap adapted for use in catching mice or rats.

The invention has for an object to provide an improved and novel trap of the type in which the animal is projected into an enclosure by a moving device released by the animal pulling on a bait hook.

For further comprehension of the invention, and of the objects and advantages thereof, reference will be had to the following description and accompanying drawings, and to the appended claims in which the various novel features of the invention are more particularly set forth.

Fig. 1 of the drawings is a partial side view and partial longitudinal vertical sectional view of an animal trap constructed according to my invention.

Fig. 4 is a perspective view of the trap.

Fig. 5 is a detail face view of the operating mechanism for the rotary element.

Fig. 6 is a transverse vertical sectional view thereof taken on the line 6—6 of Fig. 5.

Fig. 7 is a horizontal sectional view thereof taken on the line 7—7 of Fig. 5.

Fig. 8 is a detail elevational view showing a modified arrangement of the control means for the electrocuting current.

Fig. 9 is a detail perspective view of the escapement bell crank.

Figure 1:
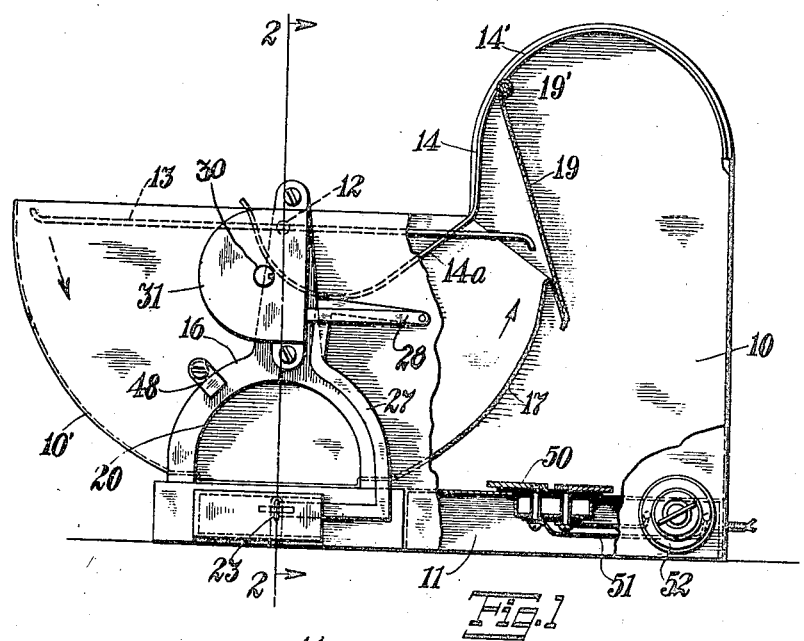
Figures 2, 3:
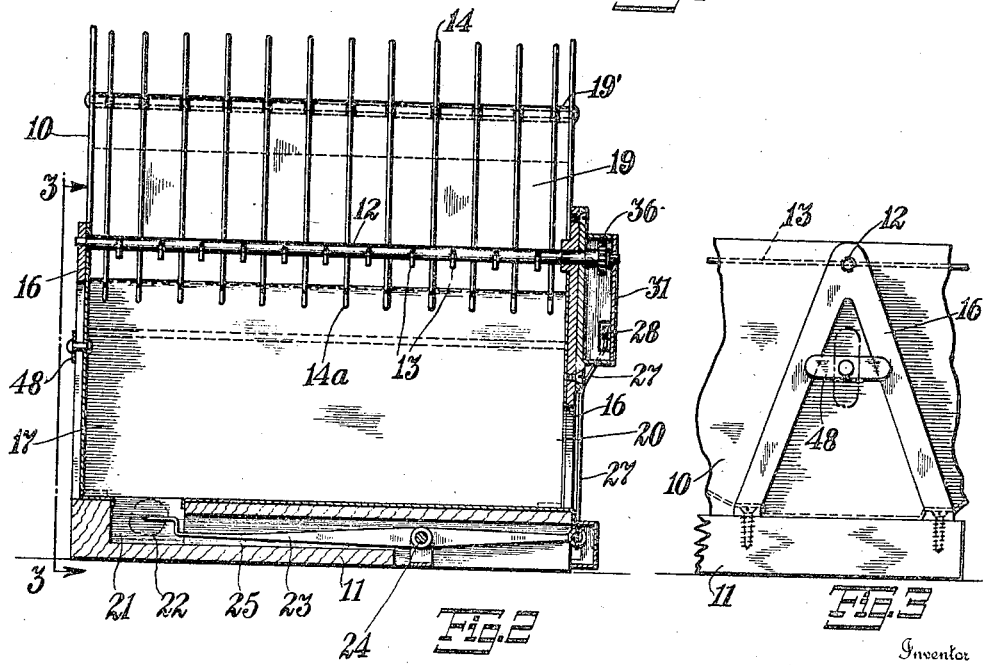
Fig. 2 is a transverse vertical section on the line 2—2 of Fig. 1.
Fig. 3 is a fragmentary side elevation illustrating particularly one of the standards for supporting the rotary element.

In constructing my improved trap I provide a generally rectangular solid side walled housing or cage 10 which is mounted on a base 11. The top of this housing is comprised partly by the rotary element consisting of a transverse shaft 12 from which the spaced rods 13 project, and partly by a series of arched rods 14 which are spaced across the cage and staggered with respect to the rods 13. The former normally occupy a horizontal position closing the top of the forward portion of the housing, while the latter present rear portions 14' arched upwardly above the normal level of the former, and front portions 14ª arched downwardly therebetween.

The front wall 10' of the housing is curved concentric to the shaft 12, which latter is journaled in frame pieces or standards 16 carried by the base 10 and extending up the side walls of the housing. Extending across within the housing 10, between the front and rear ends thereof, is a partition 17 which is secured at its lower edge to the base 10, while its upper edge is spaced below the rear ends of the rotary element, this partition being also curved concentric to the shaft 12 and forming with the front wall 10' a semicylindrical chamber into which the animal enters. The entrance to this chamber is through an opening 20 in one of the side walls of the housing.

Extending across the trap above the partition 17 is a trap door 19 which is hinged at its upper edge as at 19' and has its lower edge resting against the top edge of the partition.

Formed in the base 10 near the opposite wall of the housing to that in which is the opening 20, is a recess 21 in which the bait indicated at 22, is located, the bait being placed on the inner end of a lever 23 fulcrumed between its ends as at 24 in a transverse slot 25 in the base. The outer end of this lever projects from the base 10 and has attached thereto the lower end of a link 27 which extends upwardly outside the housing and is connected at its upper end to an arm 28 controlling the operation of a power mechanism for rotating the element 12, 13.

This power means comprises a stub shaft 30 journaled in a casing 31 fixed to the side of the cage and having connected thereto one end of a clock spring 32 whose other end is attached to the casing 31. Fixed on shaft 30 is a ratchet wheel 33 engaged by a spring pressed pawl 34 carried on a gear 35, loose on the stub shaft 30 and meshing with a pinion 36 fixed on a stub-extension 12' of shaft 12 of the rotary element. To wind the spring 32 a handle 37 is fixed on shaft 30.

In connection with this mechanism an escapement device is provided which permits of only one-half turn or revolution of the rotary element each time the bait is pulled, this escapement device comprises a bell-crank shaped element 40 from which the arm 28 projects rigidly through a slot 41 in casing 31. This element is pivoted as at 42 in the casing and is adapted for reciprocal engagement with a series of pins 43 fixed to the gear 35.

One arm 40' of this bell-crank 40 is formed with an abutment shoulder 45 to receive the pins 43 successively and hold the gear 35 against rotation. The other arm 40ª acts as a cam to be engaged by one pin to move the shoulder 45 into the path of the following pin. As one pin rides off the arm 40ª another pin rides behind the end of arm 40' and onto the shoulder 45, a notch 40ᵇ being cut in arm 40' adjacent said shoulder, through which the pin passes from the the shoulder when the lever 32 is actuated.

As a convenient means of securing the housing 10 to the frame I have shown the housing as seating freely between the frame pieces 16 and engaged therewith by means of clip members 48 rotatably carried by the housing and adapted to take over the frame pieces 16.

As a means for killing the animals after they have been deposited in the space at the rear of the trap I provide in the top face of the base 10 two suitably insulated contact bars 50 connected by wires 51 to a hand switch 52 on the base, to which switch any suitable current leads may connect.

The manner of operation of my improved trap is as follows: The animal attracted by the bait, enters through the opening 20 into the semicylindrical chamber under the rods 13. When the bait is pulled, the lever 23 is rocked, pulling link 27 and depressing the escapement arm 28, rocking the bell-crank 40 and disengaging the abutment shoulder 45 from the adjacent one of the pins 43. Gear 35 being freed is partially rotated by clock spring 32, rotating in turn pinion 36 and causing the rotary element to make a half-turn, throwing the animal through the door 19 and into the main body of the trap. As gear 35 rotates the engagement of one of the pins 43 with the cam arm 40ª of the bell crank 40 causes the latter to be rocked in an opposite direction to that in which it had just been rocked by arm 28, moving the shoulder 45 back in front of one of the following pins. As will be understood, the number of pins 43 will be proportioned to the relative sizes of the gear 35 and pinion 36 so as to make the rotary element make one half turn and come to rest with the rods 13 horizontal. As the rotary element swings, in the direction of the arrow in Fig. 1, the rods 13 engage the animal and move the latter up the partition 17 and over the latter into the rear of the cage, the door 19 yielding as the animal is thrown over the top of the partition by centrifugal force.

In Fig. 8 I have shown a modified arrangement for automatically closing the circuit to the contact bars 50. This arrangement comprises a bell-crank lever 60 suitably fulcrumed in the housing and having one arm normally projecting across the path of movement of one or more of the rods 13 and the other arm projecting into operative proximity to a pair of spring contacts 61. Connected to the bell-crank lever is the plunger 62 of a dash-pot 63 which serves to slow up return movements of the lever, it being understood that, by reason of the resiliency of the springs 61 they will not disengage from one another on initial backward movement of the lever 60, so that the bars will remain operative for electrocuting the animal for an appreciable period of time.

Having thus described my invention what I claim as new and desire to protect by Letters Patent of the United States is as follows:

1. An animal trap comprising a housing arranged to present a pair of chambers, one of said chambers having an entrance opening in the wall thereof and a second opening in the floor thereof, a rotary element adapted by rotation to cause the animal to be discharged from one chamber to the other, a bait holding lever extending under the floor of the first mentioned chamber and having one end formed to receive the bait and in registry with the said floor opening, spring power mechanism normally urging said rotary element to rotate, a detent holding said rotary element against rotation, and an operative connection between said bait holding lever and detent whereby movement of the former releases the latter.

2. In an animal trap, a housing arranged to present a pair of chambers one of which is formed with an entrance opening at one side and a recess in the bottom thereof, a rotary element in said last chamber adapted to discharge the animal into the other chamber, a bait-holding lever mounted in the bottom of said chamber and projecting into the said recess, a link connected to said bait holding lever, a hinged arm to which said link is also connected, a rotary member having operative relation with said rotary element, spring power means applied to said rotary member, a series of studs on said rotary member, and a bell-crank fixed to said arm and presenting an abutment shoulder and a cam arm adapted to be engaged by said studs, for the purpose specified.

In testimony whereof I have affixed my signature.

JOHN BARWICKI.